United States Patent [19]

Gött et al.

[11] 4,233,870

[45] Nov. 18, 1980

[54] SHEARING MACHINE FOR SEVERING PARALLEL LONGITUDINAL MEMBERS OF GRIDS OR GRATINGS

[75] Inventors: Hans Gött; Josef Ritter; Klaus Ritter; Gerhard Ritter, all of Graz, Austria

[73] Assignee: EVG Entwickoungs-Gesellschaft mbH, Graz, Austria

[21] Appl. No.: 967,410

[22] Filed: Dec. 7, 1978

[30] Foreign Application Priority Data

Mar. 2, 1978 [AT] Austria .................................. 1505/78

[51] Int. Cl.$^3$ ............................................. B23D 15/02
[52] U.S. Cl. ...................................... 83/563; 83/590; 83/620; 83/639; 83/694
[58] Field of Search ................. 83/198, 563, 578, 590, 83/620, 639, 694, 784

[56] References Cited

U.S. PATENT DOCUMENTS 720,944   2/1903   Meiklejohn .......................... 83/784 X

FOREIGN PATENT DOCUMENTS 591272   2/1978   U.S.S.R. .................................. 83/620

*Primary Examiner*—James M. Meister
*Attorney, Agent, or Firm*—Ernest F. Marmorek

[57] ABSTRACT

A shearing machine for severing parallel longitudinal members of grids or gratings has a horizontal guide-beam (9) which is stationary during the cut and upon which are provided counterbutts (17) in the manner of comb teeth; and a cutter-beam (10) which is movable parallel to and alongside the guide-beam during the cut and upon which blades (18) are provided in the manner of comb teeth, the blades cooperating with the counterbutts on the guide-beam to shear longitudinal members extending through notches (19,20) formed between adjacent counterbutts of the guide-beam and between adjacent blades of the cutter-beam. The guide-beam and the cutter-beam are guided in a machine frame for vertical movement into and out of a working position in engagement with a grid or grating and are associated for common motion in the vertical direction. Opposite to each of the two end faces of the guide-beam a respective stop-face (13,14) is provided; and opposite to each of the two end faces of the cutter-beam is arranged a respective single-acting fluid pressure-operated cylinder (5,6) which is fixed to the machine frame and has a piston (3,4) with a piston rod (15,16) formed at its end a thrust face for the respective end face of the cutter-beam for imparting to the cutter-beam a stroke parallel to the guide-beam and away from that cylinder to which fluid pressure is applied at that time.

6 Claims, 4 Drawing Figures

SHEARING MACHINE FOR SEVERING PARALLEL LONGITUDINAL MEMBERS OF GRIDS OR GRATINGS

BACKGROUND OF THE INVENTION

The invention relates to a shearing machine for severing parallel longitudinal members of grids or gratings, the machine having a horizontal guide-beam which is stationary during the cut and upon which are provided counterbutts in the manner of comb teeth; and a cutter-beam which is movable parallel to and alongside the guide-beam during the cut and upon which blades are provided in the manner of comb teeth, the blades cooperating with the counterbutts on the guide-beam to shear longitudinal members extending through notches formed between adjacent counterbutts of the guide-beam and between adjacent blades of the cutter-beam. Such a machine is hereinafter referred to as of the kind described.

Amongst "grids" are to be understood systems of families of longitudinal rods parallel with one another and cross-rods parallel with one another, which cross one another and which are connected, in particular welded together, at the points of intersection. Amongst "gratings" are on the other hand to be understood systems which consist of a family of flat steel straps standing on edge in parallel with one another and a family of round rods parallel with one another which cross these straps at right angles and which are welded into a narrow side of the flat steel straps up to a depth corresponding with their diameter.

In the case of a known shearing machine of the kind described (cf. West German O.S. No. 2,439,185) the cutter-beam is movable relatively to the guide-beam by means of a double-acting working cylinder. The guide-beam is provided with counterbutts arranged in the manner of comb teeth at equal spacings, which exhibit sidefaces running on one side essentially perpendicular to the longitudinal extent of the guidebeam and supporting during the cut the longitudinal members of the grid or grating, which is to be severed. The cutter-beam likewise exhibits blades arranged in the manner of comb teeth, which have sidefaces standing at one side essentially perpendicular to the longitudinal extent of the cutter-beam and forming cutting edges, and which during the cut cooperate with the counterbutts.

But in contrast to the counterbutts on the guide-beam the blades on the cutter-beam are not equally spaced but are arranged at different spacings in such a way that the longitudinal members of the grid or grating get cut only individually or in groups in succession.

A shearing machine so constructed has on the one hand the advantage of managing with a small driving force since there is always only one individual longitudinal member (rod or strap) being severed or a group of only a few longitudinal members simultaneously, but on the other hand it has the disadvantage that those longitudinal members which are cut first get more or less sharply bent by the blades severing them, because the grid or grating respectively is still being held together at the longitudinal members not yet severed and therefore no part of it can follow unimpeded the motion of the blades. The motion of the blades must be continued until even the last longitudinal member has been severed. In the case of machines constructed in that way the travel of the blades is therefore large, so that the longitudinal members cut first remain continuously in engagement with the blades associated with them or at least until they are bent over so far that they slide off the blades. Since the individual blades moreover come into use one after another, the deformations of the individual longitudinal members are in addition unequally large.

The wear on the blades is also large since at each cut it is always the same cutting edges that get loaded. This is particularly unwelcome because the rapid wear of the cutting edges demands a frequent exchange of the guide-beam and cutter-beam, on account of which these two beams must be connected to the driving mechanism on the one hand detachably and on the other hand also positively.

The exchange of the guide-beam and cutter-beam is a time-wasting operation which besides must also be carried out when grids or gratings having different spacings of the longitudinal members have to be cut one after another.

SUMMARY OF THE INVENTION

It is desirable to construct a shearing machine of the kind described, in such a way that with a simple overall construction rapid exchange of the guide-beam and cutter-beam is possible, distortion of the severed longitudinal members is avoided and the service life of the machine as compared with known machines is improved.

According to the invention, in a shearing machine of the kind described, the guide-beam and the cutter-beam are guided in a machine frame for vertical movement into and out of a working position in engagement with a grid or grating and are associated for common motion in the vertical direction; opposite to each of the two surfaces of the guide-beam a respective stopface is provided; and opposite to each of the two end faces of the cutter-beam is arranged a respective single-acting fluid pressure-operated cylinder which is fixed in the machine frame and has a piston with a piston rod formed at its end as a thrustface for the respective endface of the cutter-beam for imparting to the cutter-beam a stroke parallel to the guidebeam and away from that cylinder to which fluid pressure is applied at that time.

With such a construction of a shearing machine the guide-beam and the cutter-beam are guided only between two preferably flat, sliding faces. The preferably flat stop-faces abutting the endfaces of the guide-beam prevent any movement of the guide-beam in the direction of its longitudinal axis during the cut, without impeding vertical shifting of this beam. The forces necessary for the movements of the cutterbeam are transmitted as pure compressive forces via the likewise preferably flat faces of the piston rods to the endfaces of the cutter-beam, so that even the transmission of large cutting forces causes no technical difficulties of any kind. Moreover no connections of any kind need exist between the components which would have to be disconnected first upon removing the guide-beam and cutter-beam, so that the removal can be brought about in a very short time.

In the case of a preferred construction the guide-beam and the cutter-beam are enclosed near their two ends by preferably openable yokes and can be raised and lowered by means of drives engaging with these yokes. For replacement of the cutter-beam it may in the raised position of the guide-beam and cutter beam either be pulled out of the yokes in the longitudinal direction or, after opening the yokes, be removed from them upwards.

The mutual spacings of the notches provided in the beams for the reception of the longitudinal members of the grid or grating before the cut both between adjacent counterbutts on the guide-beam and between adjacent blades on the cutter-beam are preferably both equal to the mutual spacings of the longitudinal members to be severed. By this arrangment all the longitudinal members get severed simultaneously. If the cutter-beam then moves on still after completion of the cut, the grid or grating can follow this movement without impediment, whereby any distortion of the longitudinal members during the cut is excluded.

According to a further advantageous feature, each of the two sidefaces bounding a notch between two adjacent blades or counterbutts respectively forms with at least one longitudinal sideface of the guide-beam or cutter-beam respectively a cutting edge, which is capable of cooperating during the cut with the sideface of a notch in the other beam, lying diagonally opposite to it. By this arrangement it is possible to perform cuts both with a longitudinal movement of the cutterbeam relative to the guide-beam in both of the two opposite directions. The service life of the machine as compared with known machines is therefore increased by at least two, since at least twice as many cutting faces, under certain circumstances even four times as many are present as in the case of the latter. The guide-beam and the cutter-beam are advantageously made identical to one another so that they may be exchanged with one another.

A shearing machine in accordance with the invention is illustrated by way of example in the accompanying drawings, in which:

BRIEF DESCRIPTION OF THE DRAWINGS

FIGS. 3a and 3b are a side elevation and plan respectively of a portion of a guide-beam or cutter-beam.

DESCRIPTION OF THE PREFERRED EMBODIMENTS

Figure 1:
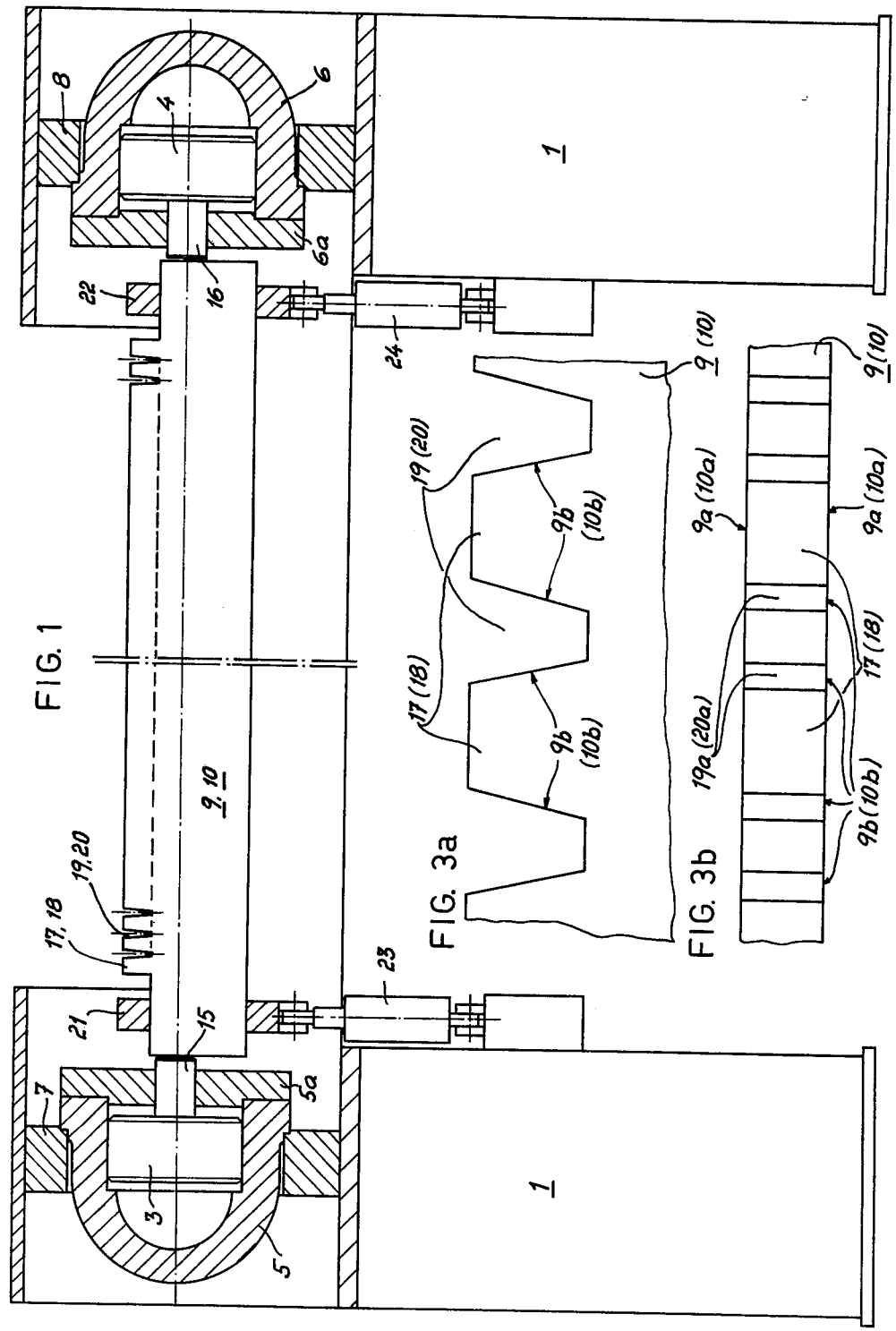
FIG. 1 is an elevation with parts cut away in vertical section.
Figure 2:
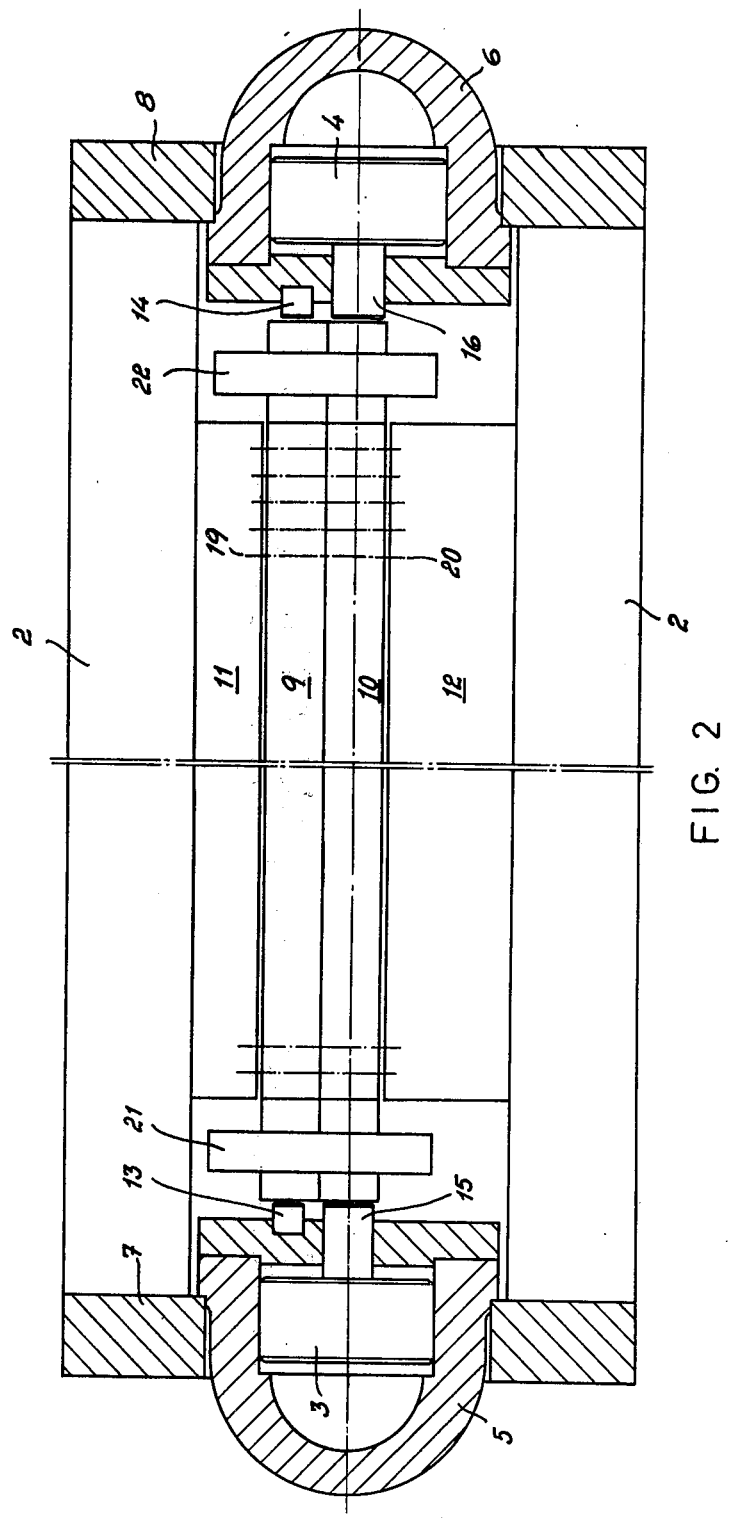
FIG. 2 is a plan with parts cut away in horizontal section.

The shearing machine illustrated has a frame 1 the two halves of which are connected by stout beams 2 extending in parallel with the longitudinal direction of a guide-beam 9 and cutter-beam 10, into a frame which can withstand the forces arising during the cut.

In each of two side portions of the machine frame 1 a single-acting piston 3 and 4 respectively is provided, working cylinders 5 and 6 respectively of which bear against an appropriately strongly made bearer-plate 7 and 8 respectively, supported in the frame 1, so that the bearer-plates 7 and 8 transmit to the beams 2 the forces exerted upon them during the cut.

The guide-beam 9 and the cutter-beam 10 which form the actual cutting mechanism are guided between the guides 11 and 12 which are built together with the beams 2 in each case into one unit, to be able to shift in vertical and horizontal directions.

Abutment pieces 13 and 14 which are fitted into endplates 5a and 6a of the operating cylinders 5 and 6 respectively and exhibit a preferably flat, sliding face for the preferably likewise flat facing endface of the guidebeam 9, secure the guide-beam 9 against shifting in its longitudinal direction but without impeding its vertical mobility.

In the same way the preferably flat end face of each of the two piston rods 15 and 16 of the pistons 3 and 4 respectively is made as a sliding face which cooperates with a preferably likewise flat endface of the cutterbeam 10 and allows a vertical relative movement of the cutter-beam 10 with respect to the piston rods 15, 16. Each of the two pistons 3, 4 is therefore positively connected to the cutter-beam 10 via the endface of the cutter-beam 10 facing it, cooperating with the base of its piston rod 15, 16, in such a way that only compressive forces directed by the piston 3 or 4 respectively towards the cutter-beam 10 can be transmitted between these two members.

The counterbutts 17 and blades 18 are arranged after the style of the teeth of a comb on narrow sides adjacent to one another, of the guide-beam 9 and cutter-beam 10 respectively and form between one another notches 19,20 into which the longitudinal rods of a grid or the flat steel straps of a grating can enter before the cut. The axial spacings of these notches are the same in both beams and correspond with the mutual axial spacings of the longitudinal members in the grid or grating.

For the performance of vertical shifting the guidebeam 9 and the cutter-beam 10 are carried in yokes 21, 22 which allow movement of the two beams relatively to the yokes only in the direction normal to the plane of the yokes. The yokes may be moved in the vertical direction by drives 23, 24 which preferably likewise incorporate working cylinders, in which case the cutter-beam 10 and the guide-beam 9 are carried along together with this movement of the yokes 21, 22. The yokes 21, 22 are advantageously composed of two halves which are connected together by bolts (not shown) which only have to withstand the inertia forces occurring upon the vertical shifting of the guide-beam and cutter-beam, so that they may easily be opened. After the opening of the yokes 21, 22 the guide-beam 9 and the cutter-beam 10 may be lifted out of the machine and exchanged.

As long as the guide-beam 9 and the cutter-beam 10 are lying in the lowered rest position a grid or grating emerging from a welding machine can be moved past in steps over them out of engagement with the two beams. Shortly before the cut the guide-beam 9 and the cutter-beam 10 are raised together by the drives 23, 24 and by the means of the yokes 21, 22 far enough for the longitudinal members of the grid or grating to enter into the notches 19, 20 between the adjacent counterbutts 17 or blades 18 respectively, which are lying in alignment.

By acting upon one of the two pistons 3 and 4 in the operating cylinders 5 or 5 filled with a fluid pressure medium the cutter-beam 10 is displaced in parallel with the guide-beam 9 far enough for the longitudial members to be severed. Since the severing of all of the longitudinal members of the grid or grating is effected simultaneously the separated piece of grid or grating can follow a further movement of the cutter-beam 10 unimpeded, so that the separated piece gets shifted sideways without distortion of the severed longitudinal members.

The cutting motion of the cutter-beam 10 with respect to the guide-beam 9 can in that case as a first alternative be carried out only far enough for all of the longitudinal members to be severed with certainty. In this case immediately subsequent to the cutting motion a return motion of the cutter-beam 10 into its starting position must follow by acting with the pressure medium upon that operating cylinder towards which the cutter-beam 10 was moved during the cut. The next cutting process can then be effected in the opposite direction so that the two sidefaces of adjacent counterbutts 17 or respectively the cutting edges of adjacent blades 18, between which in each case a notch 19, 20 is formed for the reception of a longitudinal member, get loaded alternately during the cut.

Another possibility consists in displacing the cutter-beam 10 during the cut each time over a distance which is equal to the axial spacing of the longitudinal members in the grid or grating and to provide or to employ in the cutter-beam 10 one additional notch for the longitudinal members than in the guide-beam 9. In this way after each cut, notches 19, 20 for the reception of longitudinal members are again in alignment and therefore a separate, i.e. not connected with a cut, return motion for the cutter-beam 10 after each cut can be omitted. The individual cutting motions then follow in constant alternation once by a motion of the cutter-beam 10 from right to left and the next time by a motion of the cutter-beam 10 from left to right.

A further advantage of the machine lies in the arrangement of one operating cylinder 5 respectively 6 at each of the two ends of the cutter-beam 10, so that each of the two operating cylinders has to transfer to the cutter-beam only forces of compression, whereby the problem of transferring large forces from the pistons 3, 4 to the cutter-beam 10 in a structurally favourable way is solved.

As FIGS. 3a and 3b show in side elevation and in plan respectively a guide-beam 9, or respectively an identically formed cutter-beam 10, each of the two sidefaces 19a and 20a respectively which bound a notch 19 or 20 respectively between two adjacent counterbutts 17 or blades 18 respectively, forms with at least one longitudinal sideface 9a respectively 10a of the guide-beam 9 and cutter-beam 10 respectively a cutting edge 9b or 10b respectively. If cutting edges are formed on both longitudinal sidefaces of these beams, both beams may be employed as cutter-beam in both longitudinal directions and after wear may be used again turned through 180°, so that a long working life of the shear results.

We claim:

1. In a shearing machine including a machine frame for severing parallel longitudinal members of grids or gratings, said machine having a horizontal guide-beam which is stationary during the cut and upon which are provided counterbutts in the manner of comb teeth; and a cutter-beam which is movable parallel to and alongside said guide-beam during the cut and upon which blades are provided in the manner of comb teeth, said blades cooperating with said counterbutts on said guide-beam to shear longitudinal members extending through notches formed between adjacent counterbutts of said guide-beam and between adjacent blades of said cutter-beam, the improvement comprising means guiding said guide-beam and said cutter-beam in said machine frame for vertical movement into and out of a working position and associating said guide-beam and said cutter-beam for common vertical motion; two end faces on said guide-beam and a respective stop-face provided opposite to each of said guide-beam end faces; two end faces of said cutter-beam and a respective single-acting fluid pressure-operated cylinder fixed in said machine frame opposite to each of said cutter-beam end faces, each of said cylinders having a piston with a piston rod formed at its end as a thrust face for the respective cutter-beam end face for imparting to said cutter-beam a stroke parallel to said guide-beam and away from that cylinder to which fluid pressure is applied at that time.

2. A machine according to claim 1, wherein said guide-beam and said cutter-beam are enclosed near their two ends by yokes and drive means are provided for raising and lowering said yokes and hence said guide-beam and cutter-beam.

3. A machine according to claim 2, wherein said yokes are openable for replacement of said guide-beam and said cutter-beam.

4. A machine according to claim 1, wherein the spacing of said notches along said guide-beam is the same as the spacing of said notches along said cutter-beam whereby the longitudinal members of a grid or grating, the longitudinal members of which are spaced by the same amount as said notches along said beams, can be cut simultaneously.

5. A machine according to claim 1, wherein each of said two side faces of each of said notch of at least one of said guide-beam and said cutter-beam forms a cutting edge with at least one longitudinal side face of the respective one of said guide-beam and said cutter-beam.

6. A machine according to claim 1, wherein said stop-faces for said guide-beam end faces are formed by abutment pieces inserted in an end plate of the adjacent one of said cylinders at the side of said respective piston rod.

* * * * *